United States Patent [19]
Malin

[11] 3,867,837
[45] Feb. 25, 1975

[54] MOISTURE DETECTION
[76] Inventor: Eugene F. Malin, 1920 S. Ocean Dr., Apt. 1703, Fort Lauderdale, Fla. 33316
[22] Filed: Mar. 2, 1972
[21] Appl. No.: 231,308

Related U.S. Application Data
[63] Continuation of Ser. No. 17,271, March 6, 1970, abandoned.

[52] U.S. Cl............ 73/73, 47/38, 137/344, 239/63, 137/78, 61/12, 61/13
[51] Int. Cl. ............................................. G01n 5/02
[58] Field of Search ........ 73/73, 76, 29, 335, 336.5, 73/337; 340/235; 200/61.05, 61.06, 61.07; 239/63; 137/78; 61/12, 13

[56] References Cited
UNITED STATES PATENTS
| | | | |
|---|---|---|---|
| 2,064,948 | 12/1936 | Rohne | 73/337 |
| 3,181,098 | 4/1965 | Richards | 340/235 |
| 3,204,872 | 9/1965 | Whear | 239/63 |
| 3,261,125 | 7/1966 | Arkebauer | 47/38.1 |

*Primary Examiner*—James J. Gill
*Assistant Examiner*—Anthony V. Ciarlante

[57] ABSTRACT

A moisture detector comprising a container surrounding a detection area with a channel leading out of the container, a member connected in the channel with a portion of the member inside the container and a portion of the member outside of the container, and a switch connected adjacent the distal end of the portion of the member lying inside the container. The member absorbs moisture relative to the moisture in the surrounding soil. The change in weight of the member changes the position of the distal end of the portion of the member lying inside the container to activate the switch to signal a variation in the moisture content of the soil surrounding the portion of the member lying outside the container.

9 Claims, 5 Drawing Figures

PATENTED FEB 25 1975  3,867,837

INVENTOR
EUGENE F. MALIN

MOISTURE DETECTION

This is a continuation of application Ser. No. 17,271, filed Mar. 6, 1970, now abandoned.

BACKGROUND OF THE INVENTION

This invention relates to a new and improved noncomplex moisture detector, and, more particularly, to a detector for measuring moisture in soil in order to activate irrigation means.

As is perhaps well-known, various electrical and chemical means have been designed to measure moisture in the soil. Present moisture apparatus are complex in design, costly to manufacture, and subject to severe corrosion problems.

SUMMARY OF THE INVENTION

A noncomplex moisture detector for indicating the amount of moisture in surrounding soil. The moisture detector includes a container surrounding a central detection area with at least one channel leading out of the container, a moisture absorbing member and a sensing means. The absorbing member provides the means to transport a relative amount of moisture found in the soil outside the container into the container. The absorbing member passes through the channel in the container with an outside portion of the member projecting outward from the container into surrounding soil and with an inside portion of the member projecting into the detecting area of the container. The sensing means, a mercury switch, is connected to the distal end of the inside portion in order to detect movement of the distal end of the member caused by the change in moisture content of the inside portion of the member. The mercury switch is closed to activate an irrigation system when there is no or very little moisture in the member. The mercury switch is opened when there is a relatively large amount of moisture in the member. The distal end of the inside portion of the member droops as its weight increases, thereby changing the position of the mercury in the switch. A resilient carrier beam may be used to provide added support for certain types of absorbing members. The mercury switch may be in the form of a closed loop tube to further regulate the opening and closing of the switch.

It is an object of this invention to provide a noncomplex moisture control device.

Another object of this invention is to provide a novel switching device.

A further object of this invention is to provide a low cost moisture detector.

In accordance with these and other objects which will be apparent hereinafter, the instant invention will not be described with particular reference to the accompanying drawing.

DESCRIPTION OF THE PREFERRED EMBODIMENT

Figure 1:
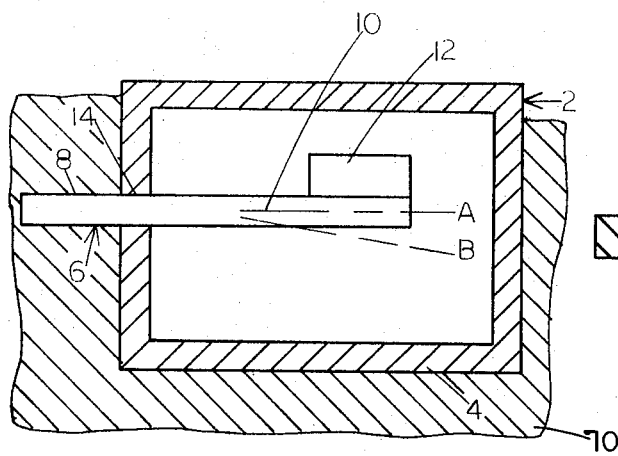
FIG. 1 is a side view in cross section of the moisture detector.

Referring now to the drawing, the moisture detector, generally designated by numeral 2, senses the amount of moisture in the soil adjacent the detector to signal irrigation means, not shown, in order to distribute water into the soil. The detector includes a container 4, an absorbing member 6 having an outer portion 8 and an inner portion 10, and a sensing means 12 connected adjacent the distal end of the inner portion of the absorbing member.

The container may be made from noncorrosive materials. The container surrounds a detecting cavity in the center of the container 4. A conduit 14 provides a passageway between the outside of the container and the detecting cavity.

The absorbing member 6 may be made from materials, such as porous plastic, glass or plastic tubing, sponge or woods, etc., in order to draw moisture from the soil surrounding the container 4 into the portion 10 of the absorbing member in the container. The moisture content of the absorbing member is relative to the moisture content in the surrounding soil. The inner portion 10 of the absorbing member 6 is supported in channel 14 as a cantilever beam. The distal end of the beam moves downwardly as the moisture content in portion 10 is increased. When moisture is transported from the outside portion of the absorbing member to the inside portion of the absorbing member, the weight of the beam will increase. The sensing means 12 senses the physical movement in order to signal the irrigation system of the moisture content of the soil.

Figure 2:
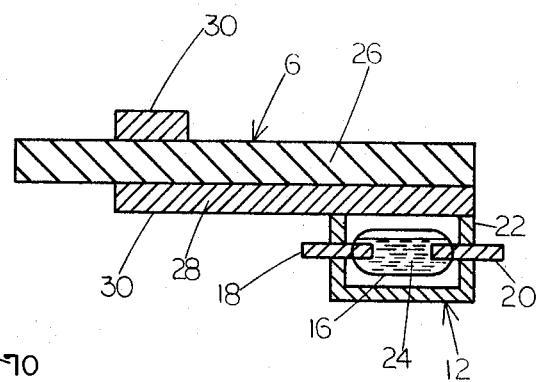
FIG. 2 is a side view in cross section of a carrier beam and absorbing member.

The sensing means 12 may be a mercury switch 16, as shown in FIG. 2, having electrical connectors 18 and 20. The mercury switch is held in the sensing means container 22. When the absorbing member 6 bends downwardly, the mercury 24 will flow away from electrical connector 18, breaking the irrigation circuit in order to stop irrigation system from distributing water into the soil. When the absorbing means is made of soft sponge material 26 or the like, the sponge material 26 may be supported by a resilient member 28. The resilient member 28 is held in place in conduit 14 adjacent 30.

It should be noted that the other biasing means may be used instead of resilient member 28. Magnetic biasing means or a spring means may be used to replace resilient member 28.

The switch may provide a means to turn the irrigation system on at one upper position of the beam and turn the irrigation off at another position of the beam. Mercury switch 32 is in the form of a tube formed into a closed loop. The electrical connectors 34 and 36 are electrically connected together by mercury in tube 32 in the position shown in FIG. 3. As the switch 32 is moved downward on beam 10, the mercury flows up tube portion 38 and down into portion 40. As the beam moves upward, the mercury moves over hump 42 through channel 44 and back into contact with electrical contacts 34 and 36. The switch 32 will switch on the irrigation device at position A and switch off the irrigation device at a lower position B, as shown in FIG. 1.

It should be noted that soil may be used as the absorbing member. The absorbing member 26 in FIG. 2 may be replaced by a soil holding tray, not shown, or a soil holding bag, not shown. When a plastic bag is used, it is filled with a particular type of soil or a type of soil similar to that surrounding the detector. The soil and bag are extended into the container 4 through conduit 14. The bag may be supported by a resilient member, such as illustrated by numeral 28 in FIG. 2 The outer portion of the bag is open so that the soil in the bag is in contact with the soil surrounding the moisture detector.

Figure 5:
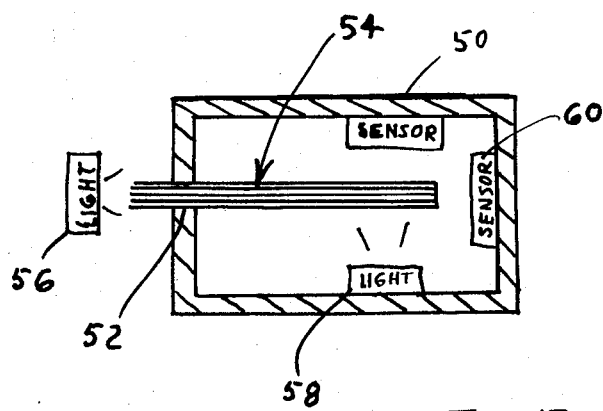
FIG. 5 is a side view of a light moisture detector.

Referring now to FIG. 5, the moisture detector may be a light moisture detector that includes a container 50, a bundle of fibers 54, and light source 56 with light sensor 58 or light source 60 with light sensors 62. The fibers 54 may be glass fibers, plastic fibers, small glass tubes or small plastic tubes, and the like. The bundle of fibers may be held together by a resilient band, not shown. The fibers draw moisture from the surrounding soil outside of the container 50 into the container along the outside surface of the fibers or along the channel in the tubular shaped fibers. A resilient means, such as shown by numeral 28 in FIG. 2, may be used to support the bundle if necessary. The varying weight of the moisture in the bundle will vary the position of the bundle between C and D, as shown in FIG. 5. The sensor 58 or sensor 62 is used to detect the position of the bundles and therefore used to detect the moisture in the soil surrounding the detector.

It should be noted that when the bundle is twisted to provide a plurality of turns or S turns between the ends of the bundle, the quantity of light between light source 56 and the sensor 60 will vary relative to the quantity of moisture within the bundle. The moisture on the sides of each fiber will vary the optical transparency of each fiber. The sensor 60 will sense a change in the light intensity, and therefore sense the amount of moisture in the soil surrounding the detector.

Figure 3:
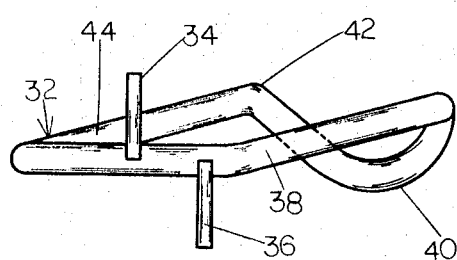
FIG. 3 is a cross section of a sensing means.
Figure 4:
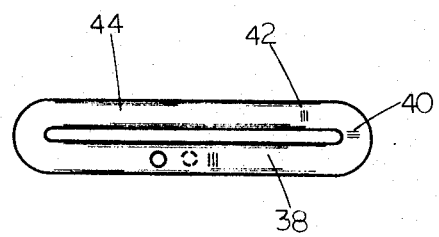
FIG. 4 is a top view of sensor shown in FIG. 3.

The specific shape of the closed loop 32, as illustrated in FIG. 3, may be varied by lowering the bend portion 42 and raising the curved portion 40 in order to vary the position of a beam when the switch is shut off or to vary the position of the beam that places the closed loop switch in the on or conducting position. Various shaped closed loop switchs may be used to provide various switching patterns.

In use the container 2 is placed in the soil 70 to surround the container with the adjacent soil to be detected. If soil is utilized as the absorbing member 26, it is placed on the tray before the container is placed in the cavity in the ground. The adjacent ground soil and the soil on the tray are then placed in contact with one another, as shown in FIGS. 1 and 2.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A porous media liquid quantity detector for detecting the quantity of liquid in adjacent porous media by transferring the liquid from the adjacent porous media to a detection area in the liquid quantity detector comprising;
    a housing member to provide a capillary transfer and supporting housing cavity in the porous media when at least a portion of said housing member is placed in the porous media,
    a liquid transfer and support means connected to said housing member, said liquid transfer and support means including,
    a supporting portion connected to said housing member, and
    a capillary transfer portion connected to said supporting means, said capillary transfer portion includes a first portion positioned to be adjacent the edge of the housing cavity to contact at a linking area the adjacent porous media to provide a capillary link for transferring liquid from said adjacent porous media along said capillary transfer portion, said capillary transfer portion includes a second portion positioned in said housing cavity for receiving the liquid transferred from said first portion, said capillary transfer portion supported between said first portion adjacent the linking area and said second portion in said cavity by said supporting portion, and
    a signal means adjacent said second portion for detecting the quantity of liquid transferred from the said first portion to said second portion to provide an electrical output signal, said signal means includes a weight sensor means for sensing the weight change in said liquid transfer and support means.

2. A porous media liquid quantity detector for detecting the quantity of liquid in adjacent porous media by transferring the liquid from the adjacent porous media to a detection area in the liquid quantity detector as set forth in claim 1, wherein;
    said liquid transfer and supportive means is positioned in a generally horizontal position between said first and second position.

3. A porous media liquid quantity detector for detecting the quantity of liquid in adjacent porous media by transferring the liquid from the adjacent porous media by a detection area in the liquid quantity detector as set forth in claim 1, wherein;
    said liquid transfer and supportive means includes a single material providing said supporting portion and said capillary transfer portion.

4. A porous media liquid quantity detector for detecting the quantity of liquid in adjacent porous media by transferring the liquid from the adjacent porous media to a detection area in the liquid quantity detector as set forth in claim 1, wherein;
    said capillary transfer portion is movably connected to said supporting portion.

5. A porous media liquid quantity detector for detecting the quantity of liquid in adjacent porous media by transferring the liquid from the adjacent porous media by a detection area in the liquid quantity detector as set forth in claim 1, wherein;
    said supporting portion is constructed of a generally non-absorbing material.

6. A porous media liquid quantity detector for detecting the quantity of liquid in adjacent porous media by transferring the liquid from the adjacent porous media to a detection area in the liquid quantity soil detector as set forth in claim 5, wherein;
    said capillary transfer portion is movably connected to said supporting means.

7. A porous media liquid quantity detector for detecting the quantity of liquid in adjacent porous media by transferring the liquid from the adjacent porous media by a detection area in the liquid quantity detector as set forth in claim 6, wherein;

said capillary transfer portion is constructed of the same material as the porous media adjacent said first portion.

8. A porous media liquid quantity detector for detecting the quantity of liquid in adjacent porous media by transferring the liquid from the adjacent porous media to a detection area in the liquid quantity detector as set forth in claim 7, wherein;
said capillary transfer portion is soil.

9. A method of detecting variations in the quantity of liquid in ground soil by the steps of;
forming a cavity in the ground,
placing and supporting transfer soil between a first position and a second position with the first position of said transfer soil in capillary contact with the soil to be detected adjacent the outside of the formed cavity for detecting variations in the quantity of liquid in said soil to be detected by detecting the weight of said transfer soil in said second position in the formed cavity, and
detecting weight variations in the liquid quantity in said transfer soil in said second position.

* * * * *